United States Patent

[11] 3,562,622

| [72] | Inventor | Douglas Aldridge-Cox |
| | | Four Oaks, England |
| [21] | Appl. No. | 709,698 |
| [22] | Filed | Mar. 1, 1968 |
| [45] | Patented | Feb. 9, 1971 |
| [73] | Assignee | S.T.D. Services Limited |
| | | Birmingham, England |
| [32] | Priority | Mar. 1, 1967 |
| [33] | | Great Britain |
| [31] | | 9691/67 |

[54] ULTRASONIC FLAW DETECTION APPARATUS WITH DATA COMPRESSION SYSTEM
3 Claims, 2 Drawing Figs.

[52] U.S. Cl............................................... 320/1, 346/33
[51] Int. Cl............................................... H02n 1/00
[50] Field of Search................................... 320/1; 340/173, 1, 3, 18 (AP); 346/33F, 34; 73/67.7—67.9; 328/151, 150, 104, 78; 324/111

[56] References Cited
UNITED STATES PATENTS

| 2,404,307 | 7/1946 | Whitaker...................... | 340/173X |
| 2,725,471 | 11/1955 | Appleton et al. ............. | 340/173X |
| 3,105,950 | 10/1963 | Harris........................... | 73/67.7X |
| 3,220,248 | 11/1965 | Wood............................ | 73/67.9X |
| 3,427,866 | 2/1969 | Weighart....................... | 73/67.9X |
| 3,430,072 | 2/1969 | Stevens ........................ | 328/151X |

*Primary Examiner*—Terrell W. Fears
*Attorney*—Glascock, Downing and Seebold

ABSTRACT: A recording means for use in ultrasonic flow detection comprises a plurality of peak reading store devices associated with sequence control logic circuits controlling the admission of flaw signals to the store devices and the reading thereof to a direct writing recorder. Each store device, whilst connected to the flaw detector instrument stores a voltage corresponding to the largest signal received. This signal is read out whilst another store device is receiving signals. The store devices each include a capacitor which is charged by incoming signals. Read out is effected through a field effect transistor, utilizing the high input impedance thereof to prevent excessive reduction of the charge on the capacitor during the readout period.

PATENTED FEB 9 1971  3,562,622

INVENTOR
D. Aldridge-Cox
BY Glascock, Downing &
Seebold
ATTORNEYS

3,562,622

ULTRASONIC FLAW DETECTION APPARATUS WITH DATA COMPRESSION SYSTEM

This invention relates to recording means for use in testing of tubes and the like by ultrasonics.

In ultrasonic flaw detection it is customary for an alarm to be operated whenever a flaw signal in excess of a predetermined level is received by the flaw detecting instrument. Such an arrangement is, however, not entirely satisfactory since it does not enable very much information regarding the nature of the flaw to be obtained. It has therefore been proposed to employ a direct writing recording instrument to make a record of the flaw signals.

However, the duration of a flaw signal is usually extremely short — for example about 1 microsecond, whereas the response time of high-speed direct writing recorders now available is very much slower — about 250 microsecond to reach 63.2 percent of the applied voltage (in response to a step function) and four times this period to reach 98.6 percent. Clearly therefore, the complete direct recordal of all the signals is not possible and the present invention stems from the realization that useful information can be obtained by recording only the peak signals received in successive time intervals.

Recording means in accordance with the invention comprises a plurality of peak reading store devices which are adapted when receiving a train of signals for a period to store a signal corresponding to the largest signal received during said period and sequence control means whereby said store devices are sequentially connected, in use, to a source of a train of flaw signals, and to a direct writing recorder, so that the recorder can record the largest flaw signal received by each store device while it was connected to the source.

Reference is now made to the accompanying drawing in which.

Figure 1:
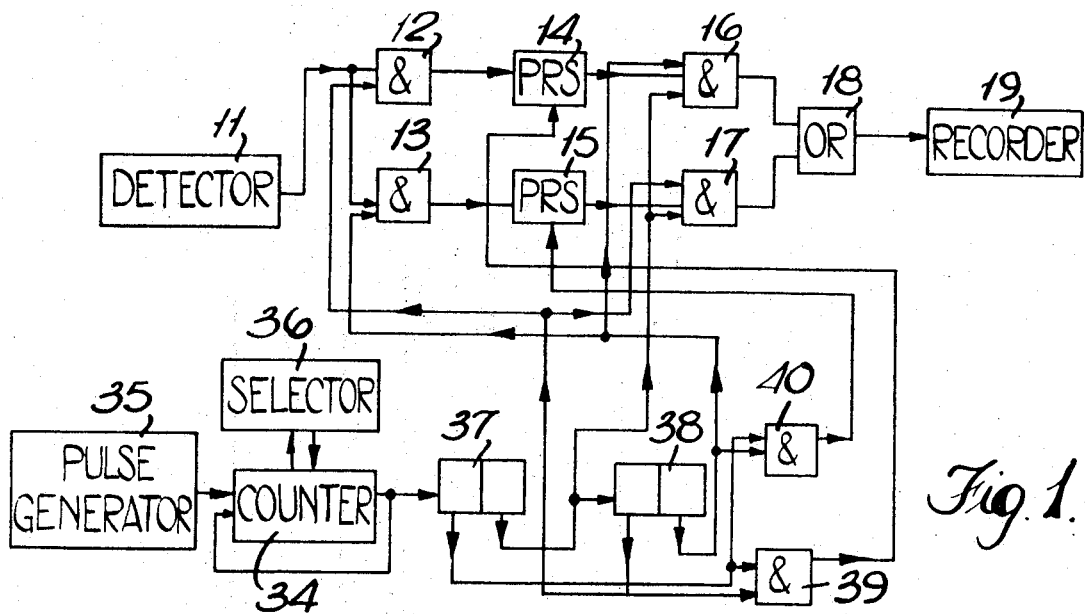
FIG. 1 is a diagrammatic representation of one example of the invention.

A detector 1 transmits flaw signals in the form of short duration DC pulses of varying magnitude. The detector 11 is connected to a pair of AND gates 12, 13 the output terminals of which are connected respectively to the input terminals of a pair of peak reading store devices 14, 15. Each of these devices includes a capacitor 20 (see FIG. 2) which is charged up by incoming signals and which, during a period of operation, retains a charge corresponding to the largest signal received during the preceding period. The output connections of the two store devices 14, 15 are connected respectively to a pair of AND gates 16, 17 the outputs of which are connected to the two inputs of an OR gate 18. The output terminal of the OR gate is connected to the input terminal of a direct writing recorder 19.

Figure 2:
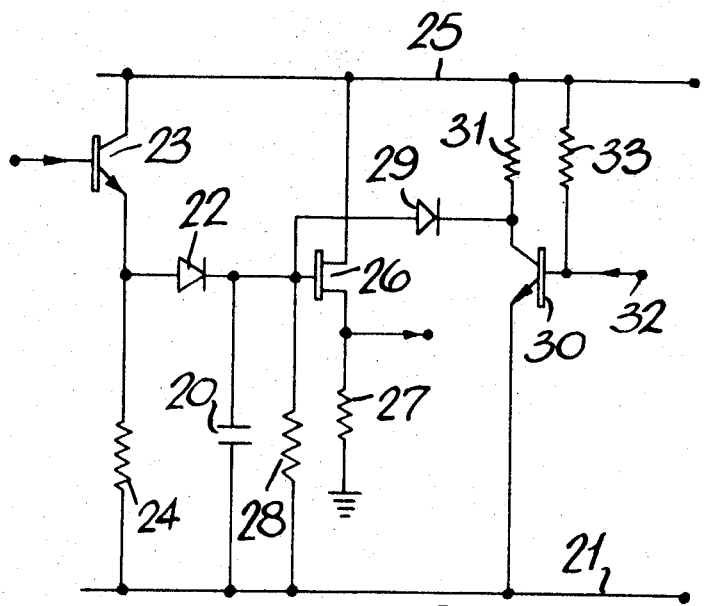
FIG. 2 is a circuit diagram of a peak reading store device included in FIG. 1.

Referring to FIG. 2 each of the store devices 14, 15 includes a capacitor 20 connected at one side to a line 21 held at a negative potential relative to earth. The other side of capacitor 20 is connected to the cathode of a diode 22 the anode of which is connected to the emitter of an NPN transistor 23. The transistor 23 is also connected via a resistor 24 to the line 21 and its collector is connected to a line 25 held at positive potential. Signals from the associated AND gate 12 or 13 are applied to the base of the transistor 23 so that the instantaneous current therethrough and hence the voltage across the resistor 24 is determined by the magnitude of the signal voltage.

The charge on the capacitor 20 is read out through the intermediary of a field effect transistor 26 with its gate connected to the cathode of the diode 22, its source connected via a resistor 27 to earth and its drain connected directly to the line 25. The appropriate input terminal of the following AND gate 16 or 17 is connected to the source of the FET 26. It will be appreciated that owing to the extremely high input impendance of the FET 26 there will be little leakage of the charge through the FET 26. A resistor 28 connecting the gate of the FET 26 to line 21 is also of extremely high ohmic value so as to safeguard the FET 26 without rapid loss of charge from the capacitor 20.

For discharging the capacitor 20 a diode 29 connects the cathode of diode 22 to the collector of an NPN transistor 30, the emitter of which is connected to the line 21. The collector of this transistor 30 is also connected via a resistor 31 to the line 21. The base of transistor 30 is connected to a "reset" terminal 32, and, via a resistor 33, to the line 25. When a signal is applied to the terminal 32 the capacitor 20 is virtually short-circuited and thus discharges rapidly.

The cycle of operation of the above described device is controlled by a sequence control circuit which includes two decade binary counter 34 driven by a pulse generator 35 (which may be a part of the detector 11). The counter 34 is associated with a selector 36 which causes the counter 34 to emit a pulse after a predetermined number of pulses have been received thereby. This acts to control the period of operation of the circuit.

The output of the counter 34 is fed to a bistable circuit 37 one output terminal of which is connected to both of the AND gates 16 and 17 and also to the input terminal of a second bistable circuit 38. The sequence control circuit also includes a pair of AND gates 39, 40 controlling the resetting of the store devices 14, 15 respectively.

As shown in FIG. 1 the other terminal of bistable circuit 37 is connected to the two AND gates 39, 40. One output terminal of bistable circuit 38 is connected to the AND gates 39, 17 and 12 and the other output terminal is connected to the AND gates 38, 16 and 13.

The cycle of operation of the system may be considered as commencing when the state of bistable circuit 38 first becomes such that an output is produced at the first-mentioned output terminal thereof. At this stage there is also an output from first-mentioned output terminal of bistable circuit 37. Thus the AND gate 12 receives an input to allow signals to be admitted to the store device 14 whilst AND gate 17 receives inputs from both bistable circuits, thereby permitting the signal stored in the device 15 to be read out and recorded by the recorder 19.

When an appropriate number of pulses have been received by the counter 34 a pulse is delivered to bistable circuit 37 to change the state thereof. This has no effect on the circuit 38 or on the gates 12 and 13 but the inputs to gates 16 and 17 from the circuit 37 are removed, thus allowing the recorder to reset itself. Simultaneously the gate 39 delivers an input to the reset terminal of store device 15 and resets same.

On receipt of the next pulse from the counter 34, both bistable circuits 37 and 38 change state. At this stage the gate 13 admits signals to the store 15 while store 14 is first read out into the recorder and then reset. The sequence described then recommences.

I claim:

1. In ultrasonic flaw detection apparatus including a detector for producing electrical flaw-indicating signals, a recording means for use in ultrasonic testing recording the flaw-indicating signals comprising a direct writing recorder, a plurality of peak reading store devices which are adapted when receiving a train of signals for a period to store a signal corresponding to the largest signal received during said period and sequence control means connecting the store devices to the detector and to the recorder and operating sequentially to connect each store device firstly to the detector for a period and subsequently to the recorder, whereby only the largest flaw-indicating signal produced by the detector in said period is recorded by the recorder.

2. Recording means as claimed in claim 1 in which each peak reading store device comprises a capacitor which stores a charge proportional to the largest signal received, a charging circuit comprising a first diode and a first transistor in series with the capacitor between conductors held at different potentials in use, the train of signals being applied, in use, to the base of said first transistor, a readout circuit comprising a field effect transistor with its gate connected to the capacitor and with a resistor in its source-drain circuit whereby a variable voltage proportional to the charge on the capacitor can be tapped from the interconnection of the field effect transistor and said resistor.

3. Recording means as claimed in claim 2 further comprising a reset circuit comprising a second diode and a second transistor connected in a series circuit with said capacitor with the ends of said circuit short-circuited, whereby application of a reset signal to the base of the second transistor causes discharging of the capacitor.